United States Patent [19]

Savall

[11] Patent Number: 4,900,437

[45] Date of Patent: Feb. 13, 1990

[54] DEVICE FOR THE INTRODUCTION OF A FLUID IN A RECEIVING MEDIUM, SUCH AS THAT OF AN APPARATUS USED FOR THE TREATMENT OF LIQUIDS, NOTABLY WATER

[75] Inventor: Monsieur V. Savall, Velizy Vallacoublay, France

[73] Assignee: Societe Degremont, Rueil Malmaison Cedex, France

[21] Appl. No.: 126,854

[22] Filed: Nov. 30, 1987

[30] Foreign Application Priority Data

Dec. 18, 1986 [FR] France .............................. 86 17741

[51] Int. Cl.$^4$ ............................................ B01D 35/00
[52] U.S. Cl. .................................... 210/232; 210/541; 239/104; 239/533.13; 239/533.14; 239/546; 239/547; 239/576; 285/197
[58] Field of Search ................ 210/541, 232; 239/104, 239/107, 533.13, 533.14, 546, 547, 576, 602, DIG. 12; 285/197; 24/545, 537

[56] References Cited

U.S. PATENT DOCUMENTS

| | | | |
|---|---|---|---|
| 3,009,655 | 11/1961 | Palmer | 239/547 |
| 3,084,869 | 9/1963 | Hutty et al. | 239/547 X |
| 3,186,644 | 6/1965 | Ross et al. | 239/533.13 |
| 3,970,251 | 7/1976 | Harmony | 239/547 X |

FOREIGN PATENT DOCUMENTS

| | | |
|---|---|---|
| 3218458 | 11/1983 | Fed. Rep. of Germany . |
| 2580622 | 10/1986 | France . |
| 0396785 | 7/1965 | Switzerland . |

*Primary Examiner*—Peter Chin
*Attorney, Agent, or Firm*—Sandler & Greenblum

[57] ABSTRACT

A device designed for being adapted to surround a duct formed with one or several orifices operable for feeding a fluid to an apparatus, such as a reactor, used for the treatment of liquids, notably water, and including a resiliently deformable membrane, also formed with one or several orifices communicating with that or those of the fluid feeding duct, characterized in that it is made of two half shells threaded and clamped onto the fluid inlet duct, one of which having a housing for the resiliently deformable membrane and an orifice for the distribution of the fluid to the apparatus.

23 Claims, 2 Drawing Sheets

DEVICE FOR THE INTRODUCTION OF A FLUID IN A RECEIVING MEDIUM, SUCH AS THAT OF AN APPARATUS USED FOR THE TREATMENT OF LIQUIDS, NOTABLY WATER

FIELD OF INVENTION

The present invention relates to a device for the introduction of a gaseous or liquid fluid in a receiving medium contained in an enclosure, by the transfer of said fluid through the orifices of a perforated tube, while advantageously providing for its equidistribution.

PRIOR ART

The distribution of a fluid in an enclosure, for example in an apparatus used for the treatment of liquids such as water, as a filter or as a reactor, can be provided in known manner by means of a network of perforated ducts. The arrangement of said ducts and their orifices allows creating a regular distribution of the orifices in the receiving medium, and the orifice sizes allow, in turn, creating in the orifices a sufficient loss of charge for reaching the equality of the fluid flow rates through the various orifices.

Said orifices however can be blocked by impurities carried by the fluid itself, or contained in the receiving medium, whether the apparatus is operating or at rest. This disadvantage is particularly present in apparatus for the purification of water, and one is very often confronted with matters in suspension, either carried by the liquid to be treated or produced by the purification treatment as such.

This is the reason why it is often necessary to protect the distribution orifices by filtration elements, such as a cloth or metallic or plastic sleeves, of bushes also formed with orifices, such as slots, of very fine size so as to avoid the introduction therein of the matters in suspension.

All these devices have in common the fact that they are never completely free from blocking, which it is desired to avoid, and that they necessitate mounting accessories such as collars, nuts and bolts, which will eventually be subjected to corrosion or will be lost; the mounting as such, or the dismantling when necessary, is therefore quite labour intensive.

The invention disclosed in French patent No. 85.06.165 allows avoiding the disadvantages of the known devices. According to this invention, the injection of the fluid through the tube orifices is made via a resilient deformable membrane, formed itself with one or several orifices, so as to be able to chase, due to the deformation as such of the membrane and of its orifice under the effect of a pressure applied thereto, the impurities eventually adhering thereon.

OBJECTS AND SUMMARY OF INVENTION

The present invention relates to a device of simple design, having no metallic or other clamping parts, easy to mount and to dismount without any tooling, capable to be used with the system disclosed in the abovementioned French patent No. 85.06.165 and, in a more general manner, with any system involving the use of a perforated and resiliently deformable membrane in order to line and protect the orifice of a duct.

The device according to the invention is characterized in that it is made of two half shells threaded and clamped onto the fluid inlet duct, one of which having a housing for the resiliently deformable membrane and an orifice for the distribution of the fluid to the apparatus.

According to another feature of the invention, the half shell receiving the membrane has an inner profile designed for accompanying and guiding its deformation, when subjected to a fluid overpressure in the duct through which it circulates.

According to a feature of the invention, the resiliently deformable membrane includes, on its periphery, a toric bead housed inside a groove of the corresponding shell, said bead having a volume superior to the depth of the groove so as to protrude toward the inside of the annular space existing between the two shells.

According to another feature of the invention, the two half shells include inner crowns fitting into each other and fixing the position of the half shells with respect to one another, and the half shell which is opposite to that housing the membrane includes a centering pin fitting into an orifice of the fluid distribution duct.

According still to another feature of the invention, the two half shells are clamped on the duct by means of clamping rings having means cooperating with the two half shells in order to facilitate the positioning of said rings and ensure their correct position once in place.

BRIEF DESCRIPTION OF DRAWINGS

The various characteristics and advantages of the invention will become more apparent from the following description, given only by way of a non limiting example, of one of its possible embodiments.

This description is made with reference to the accompanying drawings wherein.

DETAILED DESCRIPTION OF INVENTION

Figure 1:
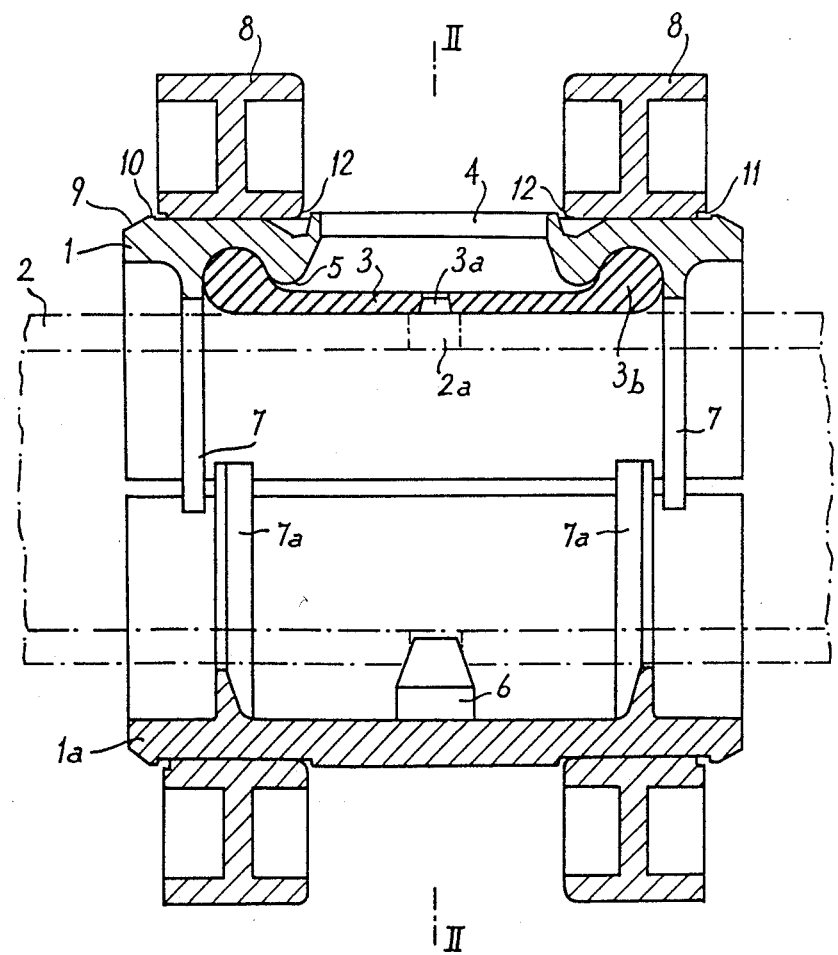
FIG. 1 is a longitudinal sectional view of the apparatus.

As shown in FIG. 1, the device according to the invention includes a body made of two half shells 1, 1a, which are threaded onto the duct 2 through which circulates a fluid and which is formed with an orifice 2a in communication with an orifice of the resiliently deformable membrane 3, for the introduction into the apparatus of the fluid circulated by a duct 2.

According to the invention, membrane 3 is formed on its periphery with a toric bead 3b introduced inside a housing of corresponding shape of half shell 1. According to the invention, the size of toric bead of membrane 3 is superior to the groove depth inside which it is housed, so that it protrudes into the annular space existing between the two half shells.

Shell 1, inside which is housed the resiliently deformable membrane, is formed with an orifice 4 of some importance, through which the fluid is admitted inside the apparatus. It has also a profile 5 the main role of which is to accompany and guide the deformation of membrane 3 when said membrane is subjected to an overpressure of the fluid circulated by duct 2.

The other half shell 1a is provided with a centering pin 6 of cylindrical conical shape, which fits inside an orifice of duct 2, thereby centering the position of half shell 1a, the two half shells 1 and 1a are formed with inner crowns 7, 7a which fit into each other, the positioning via pin 6 of half shell 1a ensuring the correct and fixed positioning of the whole device.

In the instant example, orifice 2a of duct 2 lies in the axis of orifice 3a of membrane 3, and is diametrically opposite the orifice into which fits the centering pin 6. In this case, the passage of the fluid from feeding duct 2 to the outside is direct, and the two orifices of said duct can be formed by a single machining operation.

Other dispositions are also possible within the scope of this invention, for example a different position with respect to one another of the orifice through which is provided the centering pin and the distribution orifice, or an offset disposition of orifice 2a of duct 2 with respect to the membrane orifice 3a, allowing using the latter as flap for orifice 2a.

The assembly just described is clamped onto the duct by means of clamping rings 8.

The two half shells have slanting outer faces 9 which facilitate the guiding and positioning of the clamping rings 8. They are also formed with protrusions 10 which maintain said rings, once they have been forcibly set in position by crushing the toric bead 3b. Such a crushing allows also applying the frustoconical face of centering pin 6 on the ridge of the corresponding orifice, that is ensuring the tightness of the assembly, the inside of distribution duct 2 being communicated with the outside only through orifice 3a of flexible membrane 3.

The clamping ring 8 is formed with a pair of inner peripheral edge portions 11 and 12. Inner peripheral portion or flat 11 is an arcuate cut-out which comes to rest against the protrusions 10. Rounded portion 12 makes the positioning of the rings on the half shells easy.

Figure 2:
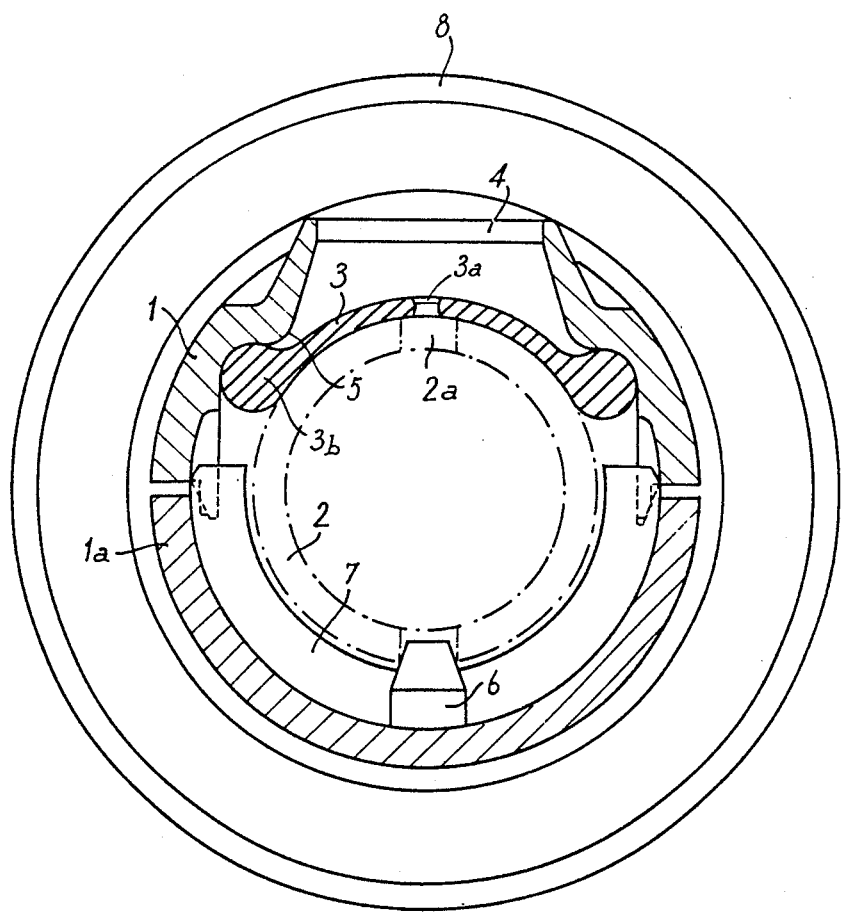
FIG. 2 is a transverse sectional view along line II—II of FIG. 1.

FIG. 2, which is a transverse sectional view, shows that membrane 3, which is naturally plane, mates with the shape of distribution duct 2 on which the device is mounted. It also shows that the tightness is provided by the toric shape imparted to the periphery of the membrane and by the cylindrical conical pin 6, and depends in no way on the machining tolerances of the device constituent parts.

If a blocking appears in orifice 3a of membrane 3, the pressure in duct 2 increases (or can be voluntary increased), thereby causing a deformation of the membrane and an enlargement of its orifice 3a, until the particle responsible for the blocking is ejected to the outside. Thereafter, membrane 3 resumes its initial shape and position.

What is claimed is:

1. A device for use with a duct, said duct having at least one duct orifice, said device comprising:
   (a) a membrane having a bead along its periphery and at least one membrane orifice for communicating with said duct orifice;
   (b) two half shells adapted to substantially surround said duct, at least one of said two half shells comprising:
      (i) means for housing said membrane including a groove within which said bead of said membrane is seated and from which said bead projects toward said duct when said half shells are positioned to substantially surround said duct, and
      (ii) a shell orifice for communicating with said duct orifice and said membrane orifice; and
   (c) means for clamping said two half shells and membrane onto said duct.

2. The device of claim 1 wherein said membrane is resiliently deformable.

3. The device of claim 2 wherein said half shell which comprises means for housing said membrane further comprises an inner profile against which said membrane is adapted to be deformed and guided.

4. The device of claim 3 wherein said inner profile is located adjacent the periphery of said partial shell orifice.

5. The device of claim 1 wherein said groove and said bead have respective shapes and dimensions such that said bead projects beyond said groove toward said duct.

6. The device of claim 5 wherein said bead is a toric bead.

7. The device of claim 5 wherein each of said two half shells has an inner crown projecting toward said duct when said two half shells are positioned to substantially surround said duct, thereby defining an annular space between said two half shells and said duct.

8. The device of claim 1 further comprising a centering pin located on one of said two half shells and projecting in a direction to engage within a second duct orifice.

9. The device of claim 8 wherein one of said two half shells houses said membrane and another of said two half shells carries said centering pin.

10. The device of claim 9 wherein said centering pin is located opposite said membrane orifice.

11. The device of claim 1 wherein each of said two half shells has a pair of slanting end portions adjacent to respective protrusions, and wherein said means for clamping comprises a pair of clamping rings, each clamping ring having a pair of inner peripheral edge portions, one of said peripheral edge portions being rounded to facilitate the positioning of said clamping rings on said half shells, and the other peripheral edge portion having an arcuate cut-out for engagement with said protrusions of said half shells for retaining said clamping rings on said half shells.

12. The device of claim 1 wherein said device consists of non-metallic material.

13. A device for use with a duct, said duct having a first and a second duct orifice, said device comprising:
   (a) a membrane having at least one membrane orifice for communicating with said first duct orifice;
   (b) two half shells adapted to substantially surround said duct, at least one of said two half shells comprising means for housing said membrane and including a shell orifice for communicating with said first duct orifice and said membrane orifice, and wherein one of said half shells includes a centering pin projecting in a direction to engage within said second duct orifice when said two half shells are positioned to substantially surround said duct; and
   (c) means for fixing said two half shells and said membrane onto said duct.

14. The device of claim 13 wherein said centering pin is substantially axially aligned with said membrane orifice.

15. The device of claim 13 wherein said device consists of non-metallic material.

16. A device for use with a duct, said duct having at least one orifice, said device comprising:
   (a) a membrane having at least one membrane orifice for communicating with said duct orifice;
   (b) two half shells adapted to substantially surround said duct, at least one of said two half shells comprising means for housing said membrane and including a shell orifice for communication with said duct orifice and said membrane orifice, and each of said two half shells having a protrusion; and (c) at least one clamping ring having a pair of inner peripheral edge portions, one of said peripheral edge portions being rounded to facilitate the positioning of said at least one clamping ring over said two half shells, and the other of said inner peripheral edge portions having an arcuate cut-out for engagement with said protrusions of said two half shells for retaining said at least one clamping ring on said two half shells.

17. The device of claim 16 wherein said at least one clamping ring comprises a pair of clamping rings, and wherein each of said two half shells includes a protrusion for engagement with one of said clamping rings.

18. The device of claim 17 wherein each of said two half shells has a pair of slanting end portions for positioning adjacent to and for engagement with a respective clamping ring.

19. The device of claim 17 wherein said device consists of non-metallic material.

20. An apparatus for treatment of a fluid comprising:
   (a) at least one duct having at least one duct orifice;
   (b) a membrane having a bead along its periphery and at least one membrane orifice for communicating with said duct orifice;
   (c) two half shells adapted to substantially surround said duct, at least one of said two half shells comprising:
      (i) means for housing said membrane including a groove within which said bead of said membrane is seated and from which said bead projects toward said duct when said half shells are positioned to substantially surround said duct, and
      (ii) a shell orifice for communicating with said duct orifice and said membrane orifice; and
   (d) means for clamping said two half shells and membrane onto said duct.

21. The apparatus of claim 20 wherein said membrane orifice is axially offset from said duct orifice whereby said membrane acts as a flap for said duct orifice.

22. The apparatus of claim 20 wherein said duct has a plurality of duct orifices for feeding fluid via said duct through said duct orifices to an apparatus for the treatment of a liquid.

23. The apparatus of claim 22 wherein said apparatus for treatment of a liquid is a reactor and said liquid is water.

* * * * *